United States Patent
Kunert

[11] Patent Number: 6,031,524
[45] Date of Patent: Feb. 29, 2000

[54] HAND-HELD PORTABLE DATA TERMINAL HAVING REMOVABLY INTERCHANGEABLE, WASHABLE, USER-REPLACEABLE COMPONENTS WITH LIQUID-IMPERVIOUS SEAL

[75] Inventor: Steven R. Kunert, Cedar Rapids, Iowa

[73] Assignee: Intermec IP Corp., Woodland Hills, Calif.

[21] Appl. No.: 08/878,492

[22] Filed: Jun. 18, 1997

Related U.S. Application Data

[63] Continuation of application No. 08/533,633, Sep. 25, 1995, abandoned, which is a continuation-in-part of application No. 08/481,654, Jun. 7, 1995, abandoned, which is a continuation-in-part of application No. 08/481,655, Jun. 7, 1995, abandoned.

[51] Int. Cl.[7] ...................................................... G09G 5/00
[52] U.S. Cl. ........................................... 345/173; 345/169
[58] Field of Search ................................... 345/168, 169, 345/173, 174, 175, 176, 177

[56] References Cited

U.S. PATENT DOCUMENTS

| | | |
|---|---|---|
| 4,158,130 | 6/1979 | Speraw et al. . |
| 4,890,832 | 1/1990 | Komaki . |
| 4,898,555 | 2/1990 | Sampson ................................... 178/18 |
| 4,916,441 | 4/1990 | Gombrich . |
| 5,023,824 | 6/1991 | Chadima, Jr. et al. . |
| 5,049,863 | 9/1991 | Oka . |
| 5,057,676 | 10/1991 | Komaki . |
| 5,146,615 | 9/1992 | Hodson et al. .......................... 345/168 |
| 5,233,502 | 8/1993 | Beatty et al. ............................ 345/173 |
| 5,468,947 | 11/1995 | Danielson et al. . |
| 5,543,588 | 8/1996 | Bisset et al. ............................. 345/173 |
| 5,572,573 | 11/1996 | Sylvan et al. ........................... 345/173 |
| 5,574,446 | 11/1996 | Dittrich et al. .......................... 345/168 |
| 5,594,470 | 1/1997 | Meyerson et al. ...................... 345/169 |
| 5,598,487 | 1/1997 | Hacker et al. ............................. 178/18 |
| 5,729,250 | 3/1998 | Bishop et al. ........................... 345/173 |

*Primary Examiner*—Matthew Luu
*Attorney, Agent, or Firm*—Suiter & Associates, PC

[57] ABSTRACT

The present invention includes a user-replaceable components assembly which permits rapid and intuitively obvious replacement of components in devices such as portable electronic devices. An environmental seal is provided around the components to protect the inner circuitry of the electronic device. Shock-resistant mounting of a display panel beneath the keypad and accommodation for the electrical connection between the keypad and the portable electronic device's inner circuitry are also provided. An environmental seal is provided around a touch sensitive panel to protect the inner circuitry of the electronic device. Shock-resistant mounting of a display panel beneath a touch sensitive panel and accommodation for the electrical connection between the touch sensitive panel and the inner circuitry of an electronic device are further provided.

29 Claims, 7 Drawing Sheets

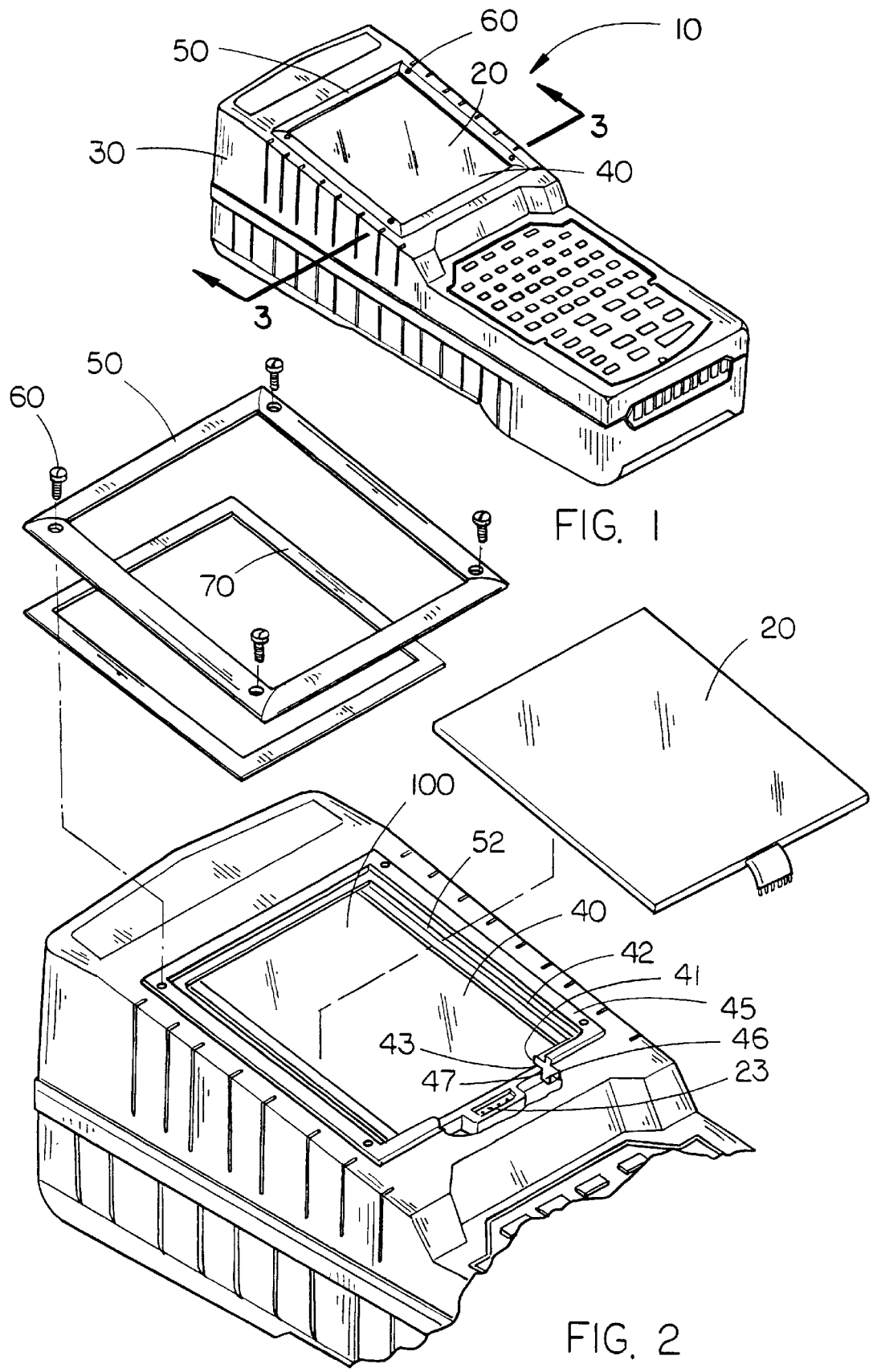

HAND-HELD PORTABLE DATA TERMINAL HAVING REMOVABLY INTERCHANGEABLE, WASHABLE, USER-REPLACEABLE COMPONENTS WITH LIQUID-IMPERVIOUS SEAL

SPECIFICATION

CROSS-REFERENCE TO RELATED APPLICATIONS

The present invention is a continuation of U.S. application Ser. No. 08/533,633 filed Sep. 29, 1995, which is a continuation-in-part of U.S. application Ser. No. 08/481,654 (Attorney Docket No. 38121) filed Jun. 7, 1995, both now abandoned, which is also a continuation-in-part of U.S. application Ser. No. 08/481,655 (Attorney Docket No. 38122) filed Jun. 7, 1995, now abandoned.

TECHNICAL FIELD

This invention relates generally to portable electronic devices employing keypads, touch sensitive panels and the like components, and more specifically to a washable, interchangeable device components assembly which allows user maintenance and replacement of the device components which are affixed thereto with a liquid-impervious seal.

BACKGROUND OF THE INVENTION

Portable electronic devices are important tools in many industries. Miniaturization and ruggedization permit employment of portable units in diverse, sometimes hostile environments. Many such devices employ keypads or other components such as touch-sensitive panels to permit entry of data by the user. Under conditions of heavy use the keys and bezel of the keypad may become worn, exposing the unit to potential damage. On occasion the keypad may become partially or completely unresponsive to touch. Replacement of a such a keypad currently requires factory overhaul, resulting in considerable expense and down-time.

A touch sensitive panel is typically mounted above a liquid crystal display panel which presents a range of selections to the user; depressing the surface of the touch sensitive panel communicates the selection to the device. In other applications the touch panel accepts the signature of a customer to denote, for example, receipt of a parcel. Under conditions of heavy use the surface of the touch sensitive panel may become cloudy, marred or torn, obscuring the image below and exposing the unit to potential damage. On occasion the circuitry of the touch sensitive panel may become partially or completely unresponsive to touch. Replacement of such a panel currently requires factory overhaul, resulting in considerable expense and down-time.

Since the unit as a whole must perform satisfactorily under wide temperature ranges and be highly resistant to intrusion by water, dust and other environmental hazards, user-replaceable device components such as the keypad or touch screen panel represents a significant engineering challenge.

SUMMARY OF THE INVENTION

The invention is a housing and components assembly permitting rapid and intuitively obvious user replacement of device components. Elements of the assembly, such as the rigid bezel, elastomer and the keypad elastomer aperture frame, cooperate to achieve an environmental seal and electrostatic discharge (ESD) protection. The keypad bezel may be fashioned of a high strength material, ribbed and attached with screws to prevent warping. A pressure rib molded into the devices outer wall supports the keypad bezel and retains the elastomer underneath the keypad. The case of the device is coated with an ESD shielding material to provide ESD protection to the printed circuit board (PCB) of the keyboard.

The invention further provides a touch panel assembly permitting rapid and intuitively obvious user replacement of touch panels. Elements of the touch pad assembly, including the rigid securing bezel, sealing gasket, and the touch panel aperture frame, cooperate to achieve an environmental seal. The securing bezel or frame may be ribbed or fashioned of a high strength material to prevent warping. A downward extension of the inner lip of the touch panel aperture frame permits shock-resistant mounting of a display panel beneath the touch panel. Accommodation is provided for electrical connection between the touch panel and the other electronic components of the device. Other similar components of the portable electronic device may be analogously engineered to achieve substantially the same objectives.

OBJECTS OF THE INVENTION

It is an object of the present invention to provide a user-replaceable components and housing assembly for a portable electronic device.

A further object of this invention is to provide a user-replaceable keypad and housing assembly for a portable electronic device.

Another object is to provide a keypad assembly for an electronic device which is resistant to the environment.

A further object is to provide an electronic device assembly which permits replacement of the keypad while maintaining environmental protection of the inner circuitry of the electronic device.

Yet another object is to provide an assembly for an electronic device in which the means for securing the keypad or other components will not detach or deform under heavy use or severe environmental conditions.

Still another object is to provide an assembly for an electronic device in which replacement of the keypad or other components is rapid, requires few tools, is intuitively obvious such that it is difficult to perform incorrectly.

An additional object is to provide an assembly for an electronic device which is economical to manufacture.

A further object of the present invention is to provide a user-replaceable touch panel and housing assembly for a portable electronic device.

A further object is to provide an assembly for an electronic device which permits replacement of the touch panel or other components while maintaining environmental protection of the devices inner circuitry.

Yet another object is to provide an assembly for an electronic device in which the means for securing the touch panel or other components will not detach or deform under heavy use or severe environmental conditions.

Still another object is to provide an assembly for an electronic device in which replacement of the touch panel or other components is rapid, requires few tools, is intuitively obvious such that it is difficult to perform incorrectly.

These and other objects and advantages will be apparent upon examination of the exemplary embodiment and accompanying drawings.

BRIEF DESCRIPTION OF THE DRAWINGS

The numerous objects and advantages of the present invention may be better understood by those skilled in the art by reference to the accompanying figures in which:

FIG. 1 is a perspective view of an exemplary portable electronic device showing the touch sensitive panel and housing assembly;

FIG. 2 is an exploded, cutaway view depicting the replaceable touch sensitive panel and touch panel housing aperture, a bezel securing the touch sensitive panel, and the electronic connector and receptacle for the touch sensitive panel;

DETAILED DESCRIPTION OF AN EXEMPLARY EMBODIMENT

Figure 3:
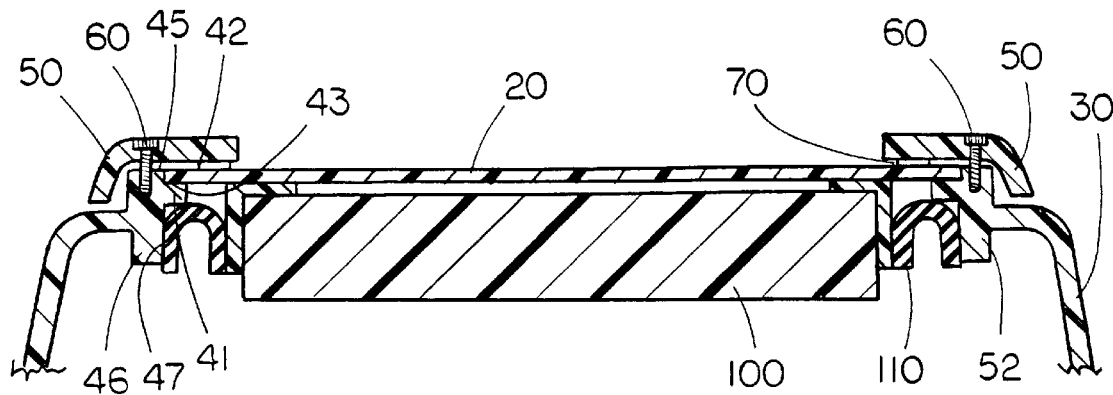
FIG. 3 is a cross sectional view of FIG. 1 depicting the relationship of the bezel, touch sensitive panel, gasket, touch panel housing aperture, display, and shock absorbing display mounting ring.

FIG. 1 depicts an exemplary embodiment of a portable electronic device showing a touch sensitive panel. The portable electronic device of the present invention is preferably a portable data collection terminal 10 typically utilized in mobile computing systems and in-premise wireless local and wide area networks. Typical applications of the data collection terminal 10 may include route accounting, field sales automation, inventory management and warehouse data management to improve accountability, productivity and management control.

The touch sensitive panel 20 is preferably nested in the touch panel aperture 40 of the housing 30, and preferably secured by a bezel 50 with securing screws 60. Features of the frame 52 surrounding the touch panel aperture 40, which may be more closely viewed in the exploded, cutaway and cross-sectional views of FIGS. 2, 3 and 4, include a horizontal inner lip 41 with an outer face 42 and an inner face 43, an upright outer lip 45 and a dependent internal lip 46 with an inner face 47. The lips (45 and 46) provide protection against environmental intrusions as well as affording secure mounts for components of the assembly.

In the embodiment depicted in FIGS. 2 and 3, the upright outer lip 45 preferably extends beyond the housing 30. The touch sensitive panel 20 rests on the outer face 42 of the horizontal inner lip 41. The bezel 50 is precision molded to provide a snug fit between the housing 30, the upright outer lip 45 and the surface of the touch sensitive panel 20. A gasket 70 may be interposed between the bezel 50 and the touch sensitive panel 20 to establish an environmental seal. Preferably, mounting screws 60 may be employed to secure the bezel 50 to the upright outer lip 45. However, in some applications another fastening means such as a snap-fit type fastening device may be adequate.

Figure 4:
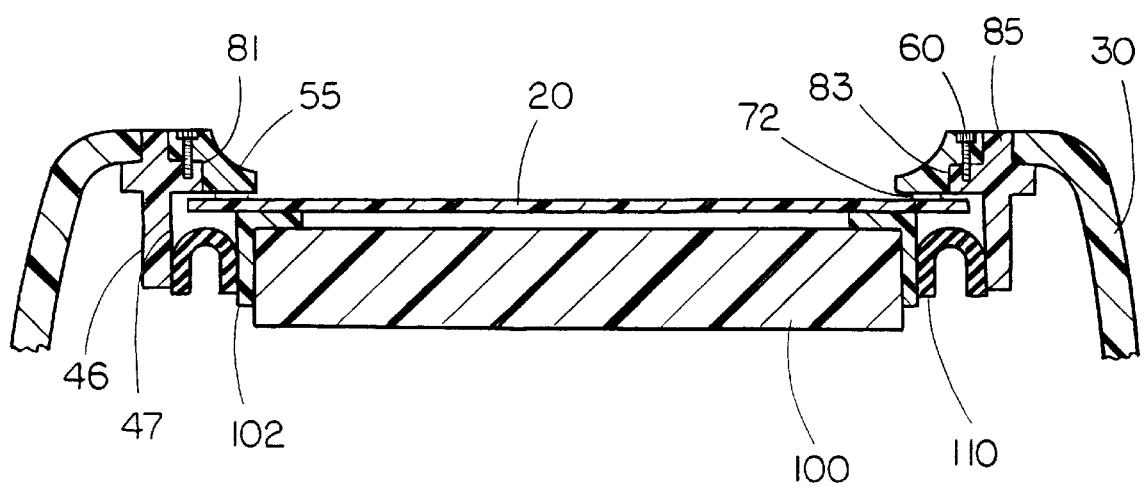
FIG. 4 is a cross sectional view showing an embodiment employing a bezel that is mounted such that it is flush to the surface of the housing to secure the touch sensitive panel within the touch panel housing aperture.

In the embodiment depicted in FIG. 4, the upright outer lip 85 is preferably flush with the surface of the housing. The touch sensitive panel 20 may be inserted beneath the horizontal inner lip 81 so that the panel abuts the inner face 83 thereof and rests directly on the display panel frame 102. A precision molded bezel 55 snaps into the stepped touch panel aperture created by the upright outer lip 85 and the horizontal inner lip 81. A gasket 72 may be interposed between the bezel 55 and touch sensitive panel 20 to establish an environmental seal. Mounting screws 60 may be inserted through the frame 55; in this instance they are preferably affixed to the horizontal inner lip 41. However, in some applications another fastening means such as a snap-fit type fastening device may be adequate.

In either of the before mentioned exemplary embodiments the dependent internal lip 46 provides structural rigidity and also may be used to mount a display 100, such as a liquid crystal display (LCD), beneath the touch sensitive panel 20. FIG. 2 depicts such a display 100 mounted against the inner face 43 of the dependent inner lip 41 and rimmed by the inner face 47 of the dependent lower lip 46. A preferred method is depicted in FIGS. 3 and 4, wherein a U-shaped, compressible mounting ring 110 is fitted within the inner face 47 of the dependent internal lip 46. This mounting ring 110 snugly holds the display 100 in place, provides protection against jarring, and constitutes another environmental barrier.

Figure 5:
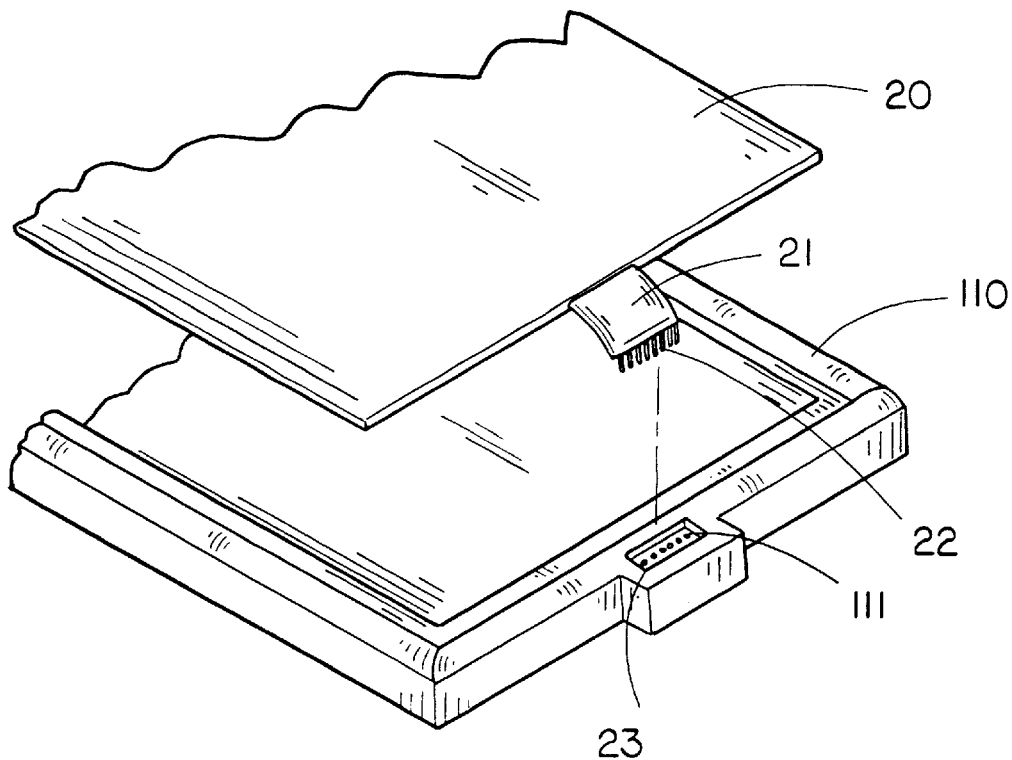
FIG. 5 is a perspective view of the shock absorbing display mounting ring showing an aperture formed within the display mounting ring to accept an electronic connection.
Figure 6:
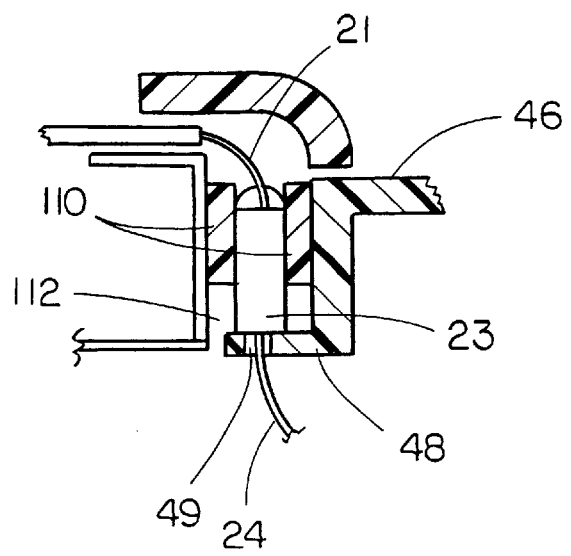
FIG. 6 is a cross sectional view showing the interrelationships of the display mounting ring aperture, connector and receptacle, and support shelf.

FIGS. 5 and 6 illustrate an aperture 111 disposed at a selected site along the perimeter of the mounting ring which may be provided to accommodate the connector 22 and receptacle 23 linking the touch sensitive panel 20 with the internal circuitry of the device (not shown). An electrical interconnection 21 such as a flexible circuit or wire or the like may be employed to connect the touch sensitive panel 20 to the connector 22, permitting easy manipulation thereof. In turn the receptacle 23 may be interconnected to the internal circuitry of the device by an electrical interconnection 24 such as a flexible circuit or wire or the like. Preferably, a snug fit is achieved between the aperture 111 and receptacle 23 by means of attachment such as a press fit in order to preserve the environmentally resistant characteristics of the mounting ring 110.

FIG. 6 illustrates an additional feature an exemplary embodiment of the present invention. At the base of the dependent internal lip 46 a support shelf 48 preferably extends under the area to be occupied by the receptacle 23. The support shelf 48 may have a slot 49 which accepts the electrical interconnection 24 such as a flexible circuit or wire or the like of the receptacle 23. Together with the sides of the mounting ring 110 this support shelf defines an open-ended chamber 112 which supports and protects the connector 21 and receptacle 23.

The structural integrity of the bezel component (50 and 55) is crucial to maintaining adequate resistance to environmental contamination. Warping of the bezel (50 and 55) may be prevented by fashioning the bezel component of material, such as a composite, that has high tensile strength and exhibits a minimum of deformation. Another option is to provide ribs (not shown) on the surface of the bezel to enhance stability and reduce warping.

Figure 7:
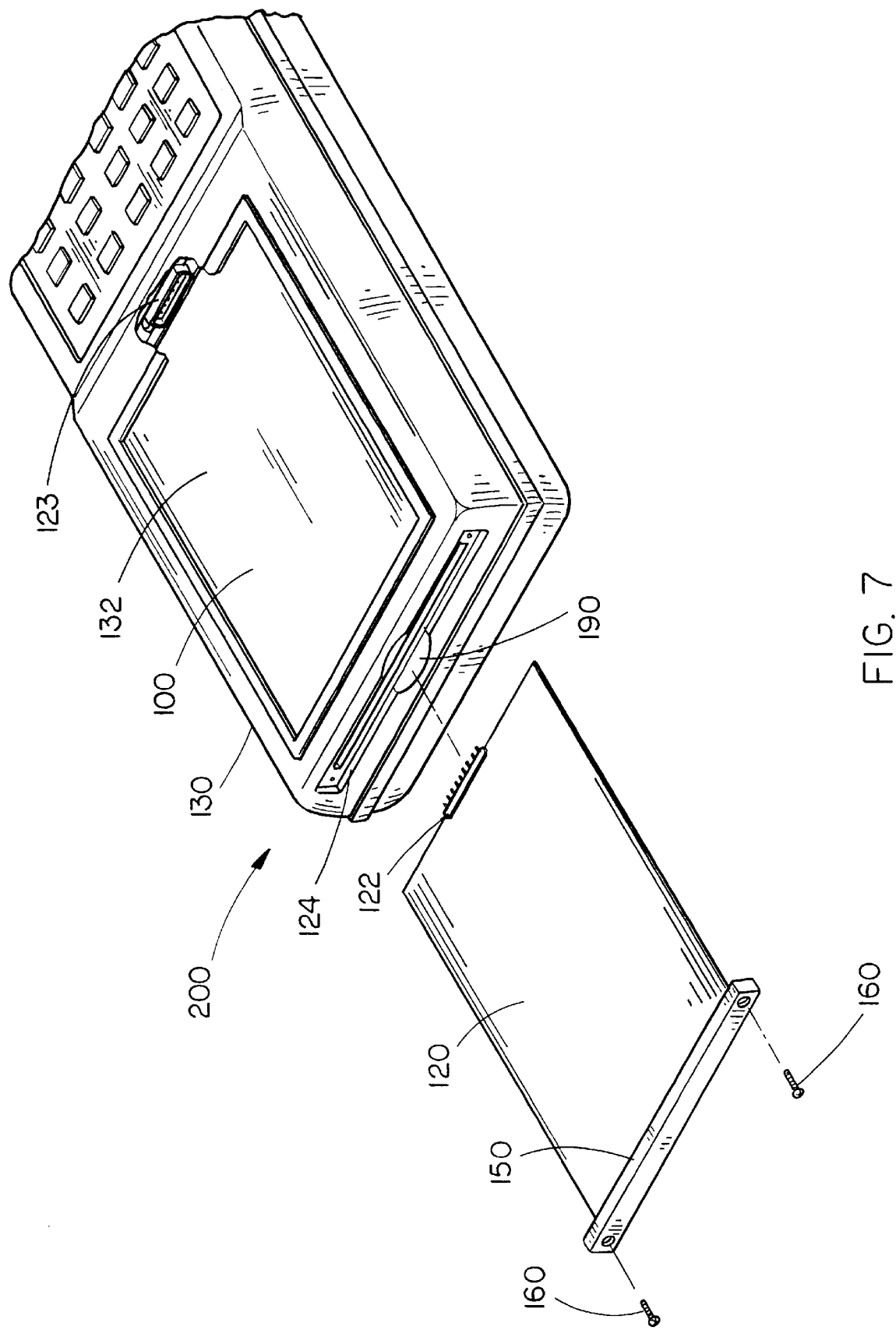
FIG. 7 is a pictorial view showing an embodiment in which an alternative method of installing a touch sensitive panel into a grooved receptacle within the portable electronic device is employed.

FIG. 7 is a pictorial view showing an embodiment in which an alternative method of installing a touch sensitive panel into a grooved receptacle within the portable electronic device is employed. A touch sensitive panel 120 may be installed in a portable electronic device 200 by inserting the touch sensitive panel 120 into an aperture 124 at one end of the devices housing 130. Connector 122 mounted at the base of the touch sensitive panel 120 preferably mates with receptacle 123 mounted at the base of the aperture cavity 132 to provide electrical interconnection of the touch sensitive panel 120 and the portable electronic device 200. A display 100 such as a liquid crystal display (LCD) may be mounted behind the touch sensitive panel 120. End cap 160 affixed to the top edge of the touch sensitive panel 120 snugly fits the shape of the aperture sealing and providing environmental protection to the device's internal electronic components (not shown). The touch sensitive panel 120 may be fastened within the device 200 by screws 160 or similar fastening apparatus which may be inserted into the portable electronic device's housing 130 though the end cap 150.

Figure 8:
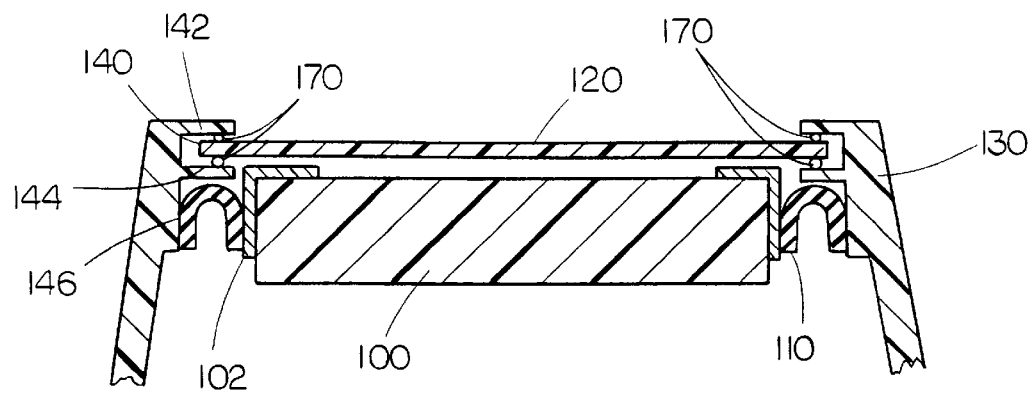
FIG. 8 is a cross sectional view of the embodiment described in FIG. 7 showing the installation of the touch sensitive panel in the portable electronic device.

FIG. 8 is a cross sectional view of the embodiment described in FIG. 7 showing the installation of the touch sensitive panel in the portable electronic device. The touch sensitive panel 120 may be inserted into grooved channels 140 formed in the device's housing 130. Gaskets 170 such as O-rings or T-seals may be interposed between the upper faces 144 and lower faces 142 of the grooved channels 140 to provide an environmental seal around the touch sensitive panel 120.

In such an embodiment, a horizontal face 146 molded into the housing 130, may be used to mount a display 100, such as a liquid crystal display (LCD), beneath the touch sensitive panel 120. A preferred method of mounting the display 100 is shown, wherein a U-shaped, compressible mounting ring 110 is fitted within the face 146 of the housing 130. This mounting ring 110 snugly holds the display 100 in place, provides protection against jarring, and constitutes another environmental barrier.

Figure 9:
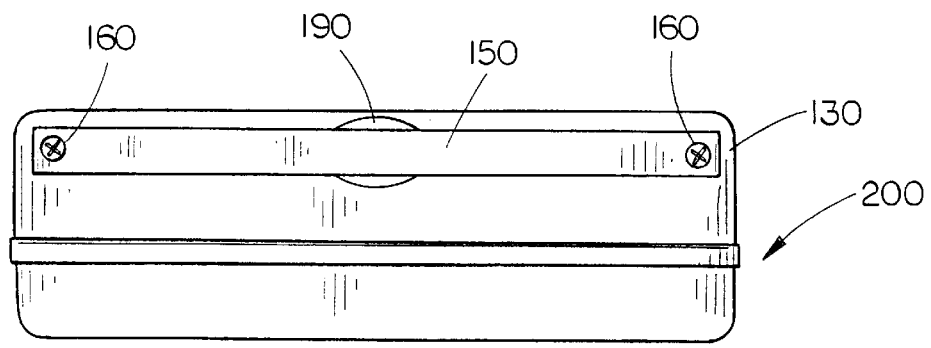
FIG. 9 is an end view of the embodiment described in FIG. 7 showing the touch sensitive panel completely inserted in the portable electronic device.

FIG. 9 is an end view of the embodiment of the invention described in FIG. 7 showing the touch sensitive panel completely inserted in the portable electronic device. End cap 150 may be securely affixed within the housing 130 of the portable electronic device 200 by screws 160 or similar fastening devices. Housing 130 may contain notches 190 arranged generally one on either side of the aperture 124 which holds end cap 150. These notches 190 allow the user to grip the end cap 150 between his or her thumb and forefinger in a pinching motion so that said user may apply a tension force away from the housing 130 to remove the touch sensitive panel (not shown) after screws 160 have been removed from the end caps 150 and housing 130.

Figure 10:
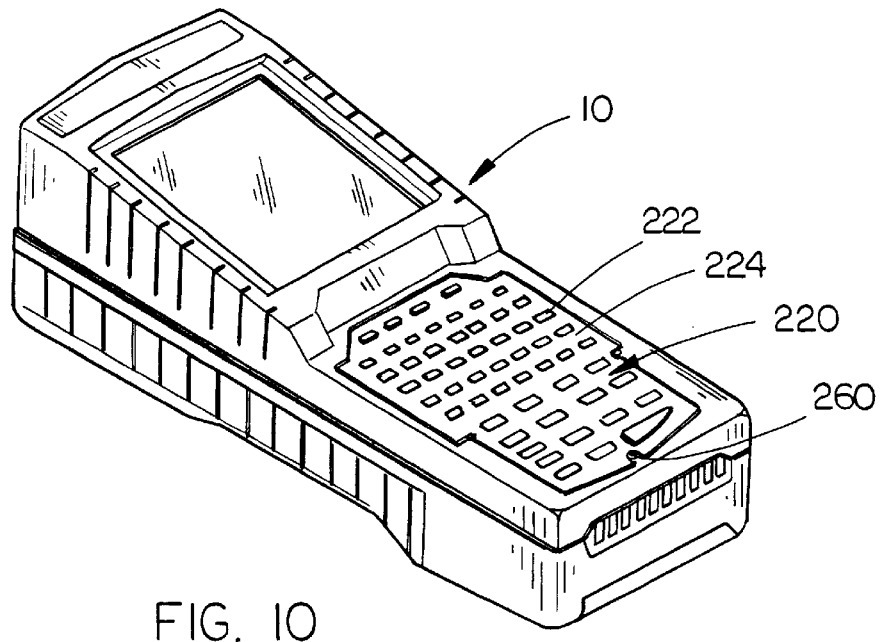
FIG. 10 is a perspective view of an exemplary portable electronic device showing the removable keypad assembly.

FIG. 10 illustrates an exemplary embodiment of a portable electronic device 10 with a user-replaceable keypad 220, consisting of keys 222 held in place by a bezel 224. The bezel 224 may be secured to the portable electronic device's housing by screws 260 or the like fastening devices.

Figure 11:
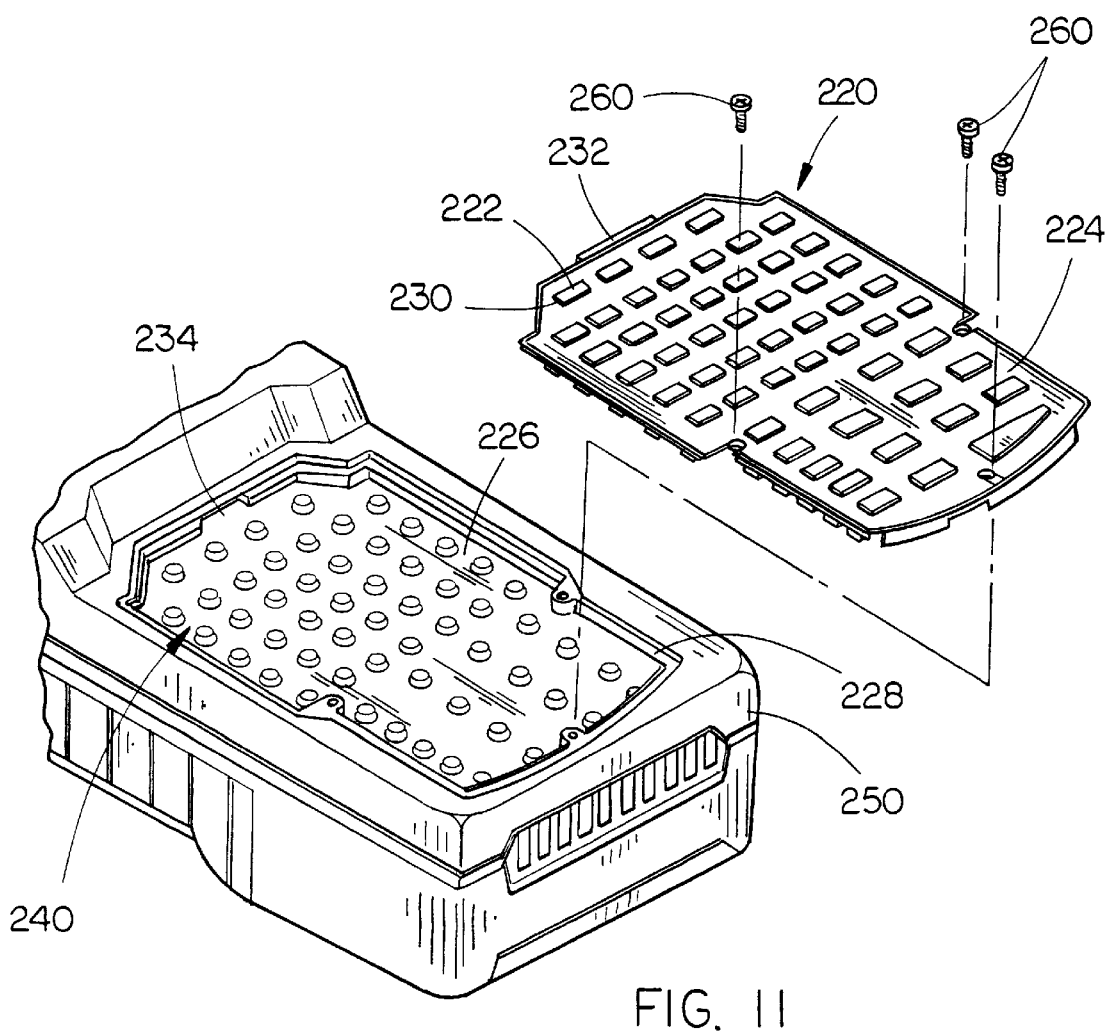
FIG. 11 is an exploded view depicting the replaceable keypad bezel, elastomer, and housing lip.

FIG. 11 is an exploded view of the embodiment of FIG. 10 depicting the replaceable keypad 220 including keys 222 and bezel 224, elastomer 226, and housing lip 228. The keypad bezel 224 consisting of a flat plate containing numerous openings 230 through which keys 222 may protrude may be nested in the keypad aperture 240 of the housing 250 on the housing lip 228, and preferably secured by securing screws 260. To prevent warping of the bezel 224, the bezel 224 may be fashioned from a high tensile strength material that will exhibit a minimum of deformation during use. Ribs (not shown) may also be molded into the underside of the bezel 224 and spaced as necessary between key openings 228 to provide stiffness to the bezel 224. Various indicia may be painted on or otherwise affixed to the bezel 224 as desired. Additionally, a tab 232 protruding from the bezel 224 may be removably inserted into a slot 234 in the electronic device's housing lip 228 to secure the bezel 224.

Figure 12:
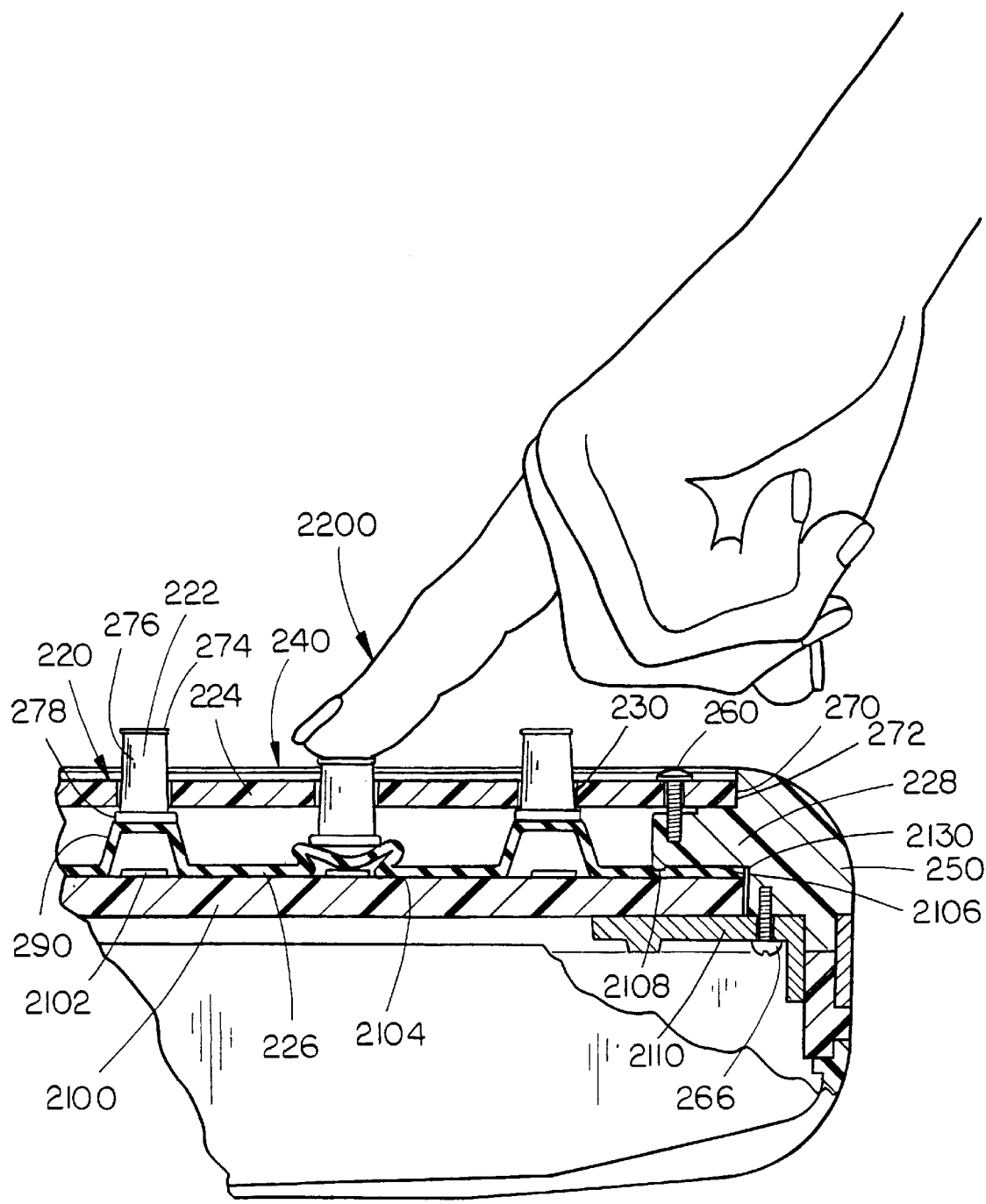
FIG. 12 is a cross sectional view of the embodiment of FIG. 10 depicting the relationship of the keypad bezel, keys, elastomer and printed circuit board (PCB).

FIG. 12 is a cross sectional view of the embodiment of FIG. 10 depicting the relationship of the housing, keypad bezel, keys, elastomer and printed circuit board (PCB) of the present invention. Preferably, the keypad 220 consisting of bezel 224 and keys 222 is secured to the housing lip by screws 260 or similar fastening devices. The bezel 224 abuts the housing lip 228 at vertical surface 270 and horizontal surface 272 and is shaped to fit snugly within the keypad aperture 240 in the electronic device's housing 250. A plurality of keys 222 may protrude through the bezel 224. Preferably, each key 222 is shaped such that it is retained within its opening 230 when the bezel 224 is removed from the housing 50. Such a shape may consist of ribs 274 around the circumference of the key 222 such that the ribs 274 will interfere with the opening 230 in the bezel 224 retaining the key within the opening 230.

The keys 222 may be comprised of an upper section 276 and a retainer 278 to aid installation of the keys 222 into the bezel's openings 230. The upper section 276 of the key 222 may be inserted through the opening 230 in the keypad bezel 224 and connected to the retainer 278 by a interference fit or other fastening means. When the bezel 224 is secured to the electronic device's housing 250 the keys 222 are preferably in contact with boots 290 molded into the elastomer 226. Preferably, the placement of these boots 290 corresponds to the arrangement of keys 222 on the keypad 220 (see FIG. 11).

When a key 222 is depressed (shown generally by 2200) the elastomer boot 290 is deformed downward contacting a contact 2102 on the upper face 2104 of the PCB 2100. The elastomer 226 may be placed generally over the upper face 2104 of the printed circuit board (PCB) 2100 and is retained securely between the upper face 2105 of the PCB 2100 and lower face 2106 of the housing lip by a pressure rib 2108. This pressure rib 2108 also provides an environmental seal between the elastomer 226 and the housing 250 and helps minimize reaction forces between the bezel 224 and PCB 2100 to minimize warp of the bezel 224.

A frame 2110 secures the PCB 2100 against the elastomer 226 and the elastomer 226 against the lower surface 2106 of the housing lip 228 thus compressing the elastomer 226 against the pressure rib 2108. This frame 2110 may be retained by screws 266 or like fastening devices. A plurality of vias 2130 may be affixed around the perimeter of the PCB 2100 to connect the PCB 2100 ground plane to ESD shielding provided by the device's housing 250.

Together the above described features of the present invention cooperate to achieve the objects recited herein, namely, the provision of a functional, user replaceable components assembly.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. In a data collection system, a hand-held portable data collection terminal having electronic data processing circuitry therein, said data collection terminal comprising:
    (a) a housing having a display aperture and a keypad aperture;
    (b) a display assembly disposed in the display aperture of said housing, said display assembly comprising:
        (i) display means disposed in the display aperture of said housing for displaying data;
        (ii) a frame disposed in the display aperture of said housing, said frame being secured within the display aperture of said housing such that said frame overlays said display means;
        (iii) an interchangeable touch sensitive panel for tactile data input removably insertible into the display aperture of said housing and disposed within said frame such that said interchangeable touch sensitive panel overlays said display means;
        (iv) a bezel removably fastened to said housing and overlaying said interchangeable touch sensitive panel such that said interchangeable touch sensitive panel is removably secured within the display aperture of said housing; and
        (v) a gasket removably disposed between said bezel and said interchangeable touch sensitive panel for providing an environmental seal therebetween; and
    (c) a keypad display assembly disposed in the keypad aperture of said housing, said keypad display assembly comprising:
        (i) a printed circuit board having an array of electrical contacts disposed thereon, said printed circuit board being disposed in the keypad aperture of said housing;
        (ii) an elastomer having an array of boots corresponding to the array of electrical contacts of said printed circuit board, said elastomer being disposed in the keypad aperture of said housing such that said elastomer overlays said printed circuit board; and
        (iii) an interchangeable keypad comprising a keypad bezel and an array of keys corresponding to the array of boots of said elastomer, said interchangeable keypad being removably insertible into the keypad aperture of said housing such that said interchangeable keypad overlays said elastomer.

2. A hand-held data terminal, comprising:
    a housing including a display for displaying information;
    a touch panel overlaying said display for providing at least one of touch and pen input of information into said hand-held data terminal, said touch panel including a first connector assembly;
    a frame disposed in said housing coincident with said display for removably receiving said touch panel, said frame including a second connector assembly; and
    a retainer for engaging said frame to retain said touch panel therein;
    wherein said second connector assembly is suitable for mating with said first connector assembly when said touch panel is retained in said frame by said retainer, and wherein said frame, retainer and first and second connector assemblies cooperate to allow removal and replacement of said touch panel.

3. The hand-held data terminal of claim 2, further comprising a gasket disposed between said retainer and said touch panel for preventing intrusion of environmental contaminants into said housing.

4. The hand-held data terminal of claim 2, further comprising a fastener for removably securing said retainer to said frame.

5. The hand-held data terminal of claim 2, wherein said retainer comprises a bezel engaging said frame, said bezel being resistant to warping so as to securely hold said touch panel in said frame.

6. The hand-held data terminal of claim 2, wherein at least one of said first connector and second connector comprises a flexible circuit.

7. The hand-held data terminal of claim 2, further comprising a display mounting assembly for mounting said display in said housing, said display mounting assembly suitable for dampening shock forces on said display.

8. The hand-held data terminal of claim 7, wherein said display mounting assembly comprises a U-shaped, compressible mounting ring, said mounting ring extending substantially around a perimeter of said display.

9. The hand-held data terminal of claim 8, wherein said mounting ring is suitable for preventing intrusion of environmental contaminants into said housing.

10. The hand-held data terminal of claim 2, further comprising a keypad.

11. The hand-held data terminal of claim 10, wherein said keypad comprises:
    a bezel having a surface and an aperture therein;
    a key held in said aperture such that said key moves within said aperture along a plane normal to said surface of said bezel when said key is depressed;
    a circuit mounted in said housing beneath said bezel, said circuit having a contact disposed thereon, said contact being positioned beneath said key;
    a cover disposed between said bezel and said circuit for preventing environmental contaminants from contacting said circuit, said cover including a resilient boot positioned between said contact and said key;
    wherein said resilient boot is collapsed as said key is depressed for closing said contact.

12. The hand-held data terminal of claim 11, further comprising a plurality of tabs coupling said circuit board to said housing, said plurality of tabs for grounding said circuit board to said housing to at least partially prevent electrostatic discharge.

13. The hand-held data terminal of claim 10, further comprising a fastener for securing said bezel to said housing.

14. The hand-held data terminal of claim 11, wherein said bezel further comprises a rib suitable for adding structural rigidity to said bezel.

15. A hand-held data terminal, comprising:
    a housing including a display for displaying information;
    a replaceable touch panel assembly, further comprising:
        a touch panel overlaying said display for providing at least one of touch and pen input of information into said hand-held data terminal, said touch panel including a first connector assembly;
        a frame disposed in said housing coincident with said display for removably receiving said touch panel, said frame including a second connector assembly; and
        a retainer for engaging said frame to retain said touch panel therein;
        wherein said second connector assembly is suitable for mating with said first connector assembly when said touch panel is retained in said frame by said retainer, and wherein said frame, retainer and first and second connector assemblies cooperate to allow removal and replacement of said touch panel;

a replaceable keypad assembly, further comprising:
- a bezel having a surface and an aperture therein;
- a key held in said aperture such that said key moves within said aperture along a plane normal to said surface when said key is depressed;
- a circuit mounted in said housing beneath said bezel, said circuit having a contact disposed thereon, said contact being positioned beneath said key;
- a cover disposed between said bezel and said circuit for preventing environmental contaminants from contacting said circuit, said cover including a resilient boot positioned between said contact and said key;
- wherein said resilient boot is collapsed as said key is depressed for closing said contact.

16. The hand-held data terminal of claim 15, further comprising a gasket disposed between said retainer and said touch panel for preventing intrusion of environmental contaminants into said housing.

17. The hand-held data terminal of claim 15, further comprising a fastener for removably securing said retainer to said frame.

18. The hand-held data terminal of claim 15, wherein said retainer comprises a bezel engaging said frame, said bezel being resistant to warping so as to securely hold said touch panel in said frame.

19. The hand-held data terminal of claim 15, wherein at least one of said first connector assembly and second connector assembly comprises a flexible circuit.

20. The hand-held data terminal of claim 15, further comprising a display mounting assembly for mounting said display in said housing, said display mounting assembly suitable for dampening shock forces on said display.

21. The hand-held data terminal of claim 20, wherein said display mounting assembly comprises a U-shaped, compressible mounting ring, said mounting ring extending substantially around a perimeter of said display.

22. The hand-held data terminal of claim 21, wherein said mounting ring is suitable for preventing intrusion of environmental contaminants into said housing.

23. The hand-held data terminal of claim 15, further comprising a plurality of tabs coupling said circuit board to said housing, said plurality of tabs for grounding said circuit board to said housing to at least partially prevent electrostatic discharge.

24. The hand-held data terminal of claim 23, further comprising a fastener for securing said bezel to said housing.

25. The hand-held data terminal of claim 24, wherein said bezel further comprises a rib suitable for adding structural rigidity to said bezel.

26. A hand-held data terminal having a replaceable keypad, comprising:
- a housing having an aperture for said replaceable keypad;
- a bezel having a surface and a key aperture therein;
- a key held in said key aperture such that said key moves within said key aperture along a plane normal to said surface of said bezel when said key is depressed;
- a circuit mounted in said housing beneath said bezel, said circuit having a contact disposed thereon, said contact being positioned beneath said key;
- a cover disposed between said bezel and said circuit for preventing environmental contaminants from contacting said circuit, said cover including a resilient boot positioned between said key and said contact;
- wherein said resilient boot is collapsed as said key is depressed for closing said contact.

27. The hand-held data terminal of claim 26, further comprising a plurality of tabs coupling said circuit board to said housing, said plurality of tabs for grounding said circuit to said housing to at least partially prevent electrostatic discharge.

28. The hand-held data terminal of claim 26, further comprising a fastener for securing said bezel to said housing.

29. The hand-held data terminal of claim 26, wherein said bezel further comprises a rib suitable for adding structural rigidity to said bezel.

* * * * *